United States Patent
Sun et al.

(10) Patent No.: US 11,301,037 B2
(45) Date of Patent: Apr. 12, 2022

(54) VIRTUAL REALITY INTERACTION METHOD, VIRTUAL REALITY INTERACTION APPARATUS, VIRTUAL REALITY DISPLAY APPARATUS, AND COMPUTER-PROGRAM PRODUCT

(71) Applicants: BEIJING BOE OPTOELECTRONICS TECHNOLOGY CO., LTD., Beijing (CN); BOE Technology Group Co., Ltd., Beijing (CN)

(72) Inventors: Jiankang Sun, Beijing (CN); Hao Zhang, Beijing (CN); Lili Chen, Beijing (CN); Minglei Chu, Beijing (CN); Guixin Yan, Beijing (CN); Guobing Yin, Beijing (CN); Hongzhen Xue, Beijing (CN); Fuqiang Ma, Beijing (CN)

(73) Assignees: BEIJING BOE OPTOELECTRONICS TECHNOLOGY CO., LTD., Beijing (CN); BOE Technology Group Co., Ltd., Beijing (CN)

( * ) Notice: Subject to any disclaimer, the term of this patent is extended or adjusted under 35 U.S.C. 154(b) by 427 days.

(21) Appl. No.: 16/336,593

(22) PCT Filed: Aug. 23, 2018

(86) PCT No.: PCT/CN2018/101866
§ 371 (c)(1),
(2) Date: Mar. 26, 2019

(87) PCT Pub. No.: WO2019/169834
PCT Pub. Date: Sep. 12, 2019

(65) Prior Publication Data
US 2021/0333868 A1    Oct. 28, 2021

(30) Foreign Application Priority Data
Mar. 5, 2018    (CN) .......................... 201810178212.7

(51) Int. Cl.
G06F 3/01 (2006.01)
G06K 9/00 (2006.01)
G06K 9/40 (2006.01)

(52) U.S. Cl.
CPC .......... G06F 3/013 (2013.01); G06K 9/0061 (2013.01); G06K 9/00604 (2013.01); G06K 9/40 (2013.01)

(58) Field of Classification Search
CPC ...... G06F 3/013; G06F 3/0485; G06F 3/0483; G06F 3/017; G06F 3/04855;
(Continued)

(56) References Cited

U.S. PATENT DOCUMENTS

| 6,637,883 B1 | 10/2003 | Tengshe et al. |
| 2013/0169531 A1* | 7/2013 | Jahnke .................... G06F 3/017 345/158 |

(Continued)

FOREIGN PATENT DOCUMENTS

| CN | 101576771 A | 11/2009 |
| CN | 103838372 A | 6/2014 |

(Continued)

OTHER PUBLICATIONS

International Search Report & Written Opinion dated Dec. 3, 2018, regarding PCT/CN2018/101866.
(Continued)

*Primary Examiner* — Abhishek Sarma
(74) *Attorney, Agent, or Firm* — Intellectual Valley Law, P.C.

(57) ABSTRACT

The present application provides a virtual reality interaction method. The virtual reality interaction method includes
(Continued)

acquiring a reference pupil image of a user; determining a pupil position in the reference pupil image; determining a gaze point in a virtual image based on the pupil position in the reference pupil image and a mapping relationship between first coordinates in a first coordinate system of the reference pupil image and second coordinates in a second coordinate system of the virtual image; and executing an operation based on a determination that the gaze point is in an activatable region of the virtual image and a determination of a gaze state.

18 Claims, 4 Drawing Sheets

(58) Field of Classification Search
CPC ............ G06F 3/04847; G06F 3/04845; G06F 2203/011; G06F 2203/012; G06K 9/00604; G06K 9/40; G06K 9/0061; G06K 9/00281
See application file for complete search history.

(56) References Cited

U.S. PATENT DOCUMENTS

| | | | |
|---|---|---|---|
| 2015/0338915 A1* | 11/2015 | Publicover | G06K 9/00617 345/633 |
| 2017/0192500 A1 | 7/2017 | Hao | |
| 2017/0293357 A1 | 10/2017 | Li et al. | |

FOREIGN PATENT DOCUMENTS

| | | |
|---|---|---|
| CN | 104866100 A | 8/2015 |
| CN | 105867603 A | 8/2016 |
| CN | 105892642 A | 8/2016 |
| CN | 106407772 A | 2/2017 |

OTHER PUBLICATIONS

First Office Action in the Chinese Patent Application No. 201810178212.7, dated Aug. 15, 2019; English translation attached.

* cited by examiner

VIRTUAL REALITY INTERACTION METHOD, VIRTUAL REALITY INTERACTION APPARATUS, VIRTUAL REALITY DISPLAY APPARATUS, AND COMPUTER-PROGRAM PRODUCT

CROSS-REFERENCE TO RELATED APPLICATION

This application is a national stage application under 35 U.S.C. § 371 of International Application No. PCT/CN2018/101866, filed Aug. 23, 2018, which claims priority to Chinese Patent Application No. 201810178212.7, filed Mar. 5, 2018, the contents of which are incorporated by reference in the entirety.

TECHNICAL FIELD

The present invention relates to display technology, more particularly, to a virtual reality interaction method, a virtual reality interaction apparatus, a virtual reality display apparatus, and a computer-program product.

BACKGROUND

The virtual reality technology is a technology based on immersion and imagination. The virtual reality technology uses shape processing techniques and image processing techniques to generate a virtual reality environment. By simulating human vision, hearing, touching, and so on, a user may experience a virtual reality environment as real as the real world.

SUMMARY

In one aspect, the present invention provides a virtual reality interaction method, comprising acquiring a reference pupil image of a user; determining a pupil position in the reference pupil image; determining a gaze point in a virtual image based on the pupil position in the reference pupil image and a mapping relationship between first coordinates in a first coordinate system of the reference pupil image and second coordinates in a second coordinate system of the virtual image; and executing an operation based on a determination that the gaze point is in an activatable region of the virtual image and a determination of a gaze state.

Optionally, the virtual reality interaction method further comprises determining whether the gaze point is in the activatable region of the virtual image; and determining the gaze state of the user.

Optionally, determining the pupil position in the reference pupil image comprises performing a noise filtering process on the reference pupil image to generate a filtered image; separating an image of pupil from the filtered image; removing interference points from the image of pupil; ellipse fitting edge points of the image of pupil subsequent to removing the interference points to obtain an elliptical pupil region; and calculating a central point of the elliptical pupil region, thereby determining the pupil position.

Optionally, the virtual reality interaction method further comprises determining the mapping relationship between the first coordinates in the first coordinate system of the reference pupil image and the second coordinates in the second coordinate system of the virtual image; wherein the determining the mapping relationship comprises selecting a first calibration point, a second calibration point, and a third calibration point in the virtual image, the first calibration point, the second calibration point, and the third calibration point being non-collinear; displaying the first calibration point in a first calibration virtual image, the second calibration point in a second calibration virtual image, and the third calibration point in a third calibration virtual image; acquiring a first calibration pupil image captured when the user is gazing at the first calibration point in the first calibration virtual image, a second calibration pupil image captured when the user is gazing at the second calibration point in the second calibration virtual image, and a third calibration pupil image captured when the user is gazing at the third calibration point in the third calibration virtual image; determining a first calibration pupil position in the first calibration pupil image, a second calibration pupil position in the second calibration pupil image, and a third calibration pupil position in the third calibration pupil image; and calculating a gaze calibration coefficient based on the first calibration pupil position, the second calibration pupil position, the third calibration pupil position, and positions of the first calibration point, the second calibration point, and the third calibration point in the virtual image.

Optionally, the gaze calibration coefficient is expressed as:

$$X_{scale} = \frac{(x_O - x_A) + (x_B - x_O)}{|x'_O - x'_A| + |x'_B - x'_O|},$$

$$Y_{scale} = \frac{(y_O - y_A) + (y_B - y_O)}{|y'_O - y'_A| + |y'_B - y'_B|};$$

wherein $X_{scale}$ is a horizontal calibration coefficient, $Y_{scale}$ is a vertical calibration coefficient. $x_O$ is a horizontal coordinate of the first calibration point, $y_O$ is a vertical coordinate of the first calibration point, $x_A$ is a horizontal coordinate of the second calibration point, $y_A$ is a vertical coordinate of the second calibration point, $x_B$ is a horizontal coordinate of the third calibration point, $y_B$ is a vertical coordinate of the third calibration point, $x'_O$ is a horizontal coordinate of the first calibration pupil position when the user is gazing at the first calibration point in the first calibration virtual image, $Y'_O$ is a vertical coordinate of the first calibration pupil position when the user is gazing at the first calibration point in the first calibration virtual image. $x'_A$ is a horizontal coordinate of the second calibration pupil position when the user is gazing at the second calibration point in the second calibration virtual image, $y'_A$ is a vertical coordinate of the second calibration pupil position when the user is gazing at the second calibration point in the second calibration virtual image. $x'_B$ is a horizontal coordinate of the third calibration pupil position when the user is gazing at the third calibration point in the third calibration virtual image, and $y'_B$ is a vertical coordinate of the third calibration pupil position when the user is gazing at the third calibration point in the third calibration virtual image.

Optionally, a position of the gaze point in the virtual image is determined according to:

$$X_{gaze} = x_O + X_{scale} * (x'_O - x),$$

$$Y_{gaze} = y_O + Y_{scale} * (y'_O - y);$$

wherein $X_{gaze}$ is a horizontal coordinate of the position of the gaze point in the virtual image, $Y_{gaze}$ is a vertical coordinate of the position of the gaze point in the virtual image, $X_{scale}$ is the horizontal calibration coefficient, $Y_{scale}$ is the vertical calibration coefficient. $x_O$ is the horizontal coordinate of the first calibration point, $y_O$ is the vertical coordinate of the first calibration point, $x'_O$ is the horizontal coordinate of the first calibration pupil position when the user is gazing at the first calibration point in the first calibration virtual image, $y'_O$ is the vertical coordinate of the first calibration pupil position when the user is gazing at the first calibration point in the first calibration virtual image, x is a horizontal coordinate of the pupil position in the reference pupil image when the user is gazing at a point in the virtual image, and y is a vertical coordinate of the pupil position in the reference pupil image when the user is gazing at a point in the virtual image.

Optionally, executing the operation based on the determination that the gaze point is in the activatable region of the virtual image and the determination of the gaze state comprises acquiring a plurality of reference pupil images during a time period; determining a total number of times, N, the gaze point is in the activatable region of the virtual image during the time period based on the plurality of reference pupil images; executing a first operation in a first interaction mode based on a determination of N2>N≥N1, and resetting N to zero; executing a second operation in a second interaction mode based on a determination of N3>N≥N2, and resetting N to zero; executing a third operation in a third interaction mode based on a determination of N≥N3, and resetting N to zero; and executing no operation based on a determination of N<N1; wherein $N_1 < N_2 < N_3$.

Optionally, acquiring the reference pupil image of the user comprises acquiring a reference pupil image of a single eye of the user, determining the pupil position in the reference pupil image comprises determining the pupil position of the single eye in the reference pupil image of the single eye of the user, determining the gaze point in the virtual image comprises determining a gaze point of the single eye in the virtual image; and executing the operation is based on a determination that the gaze point of the single eye is in the activatable region of the virtual image and a determination of a gaze state of the single eye.

In another aspect, the present invention provides a virtual reality interaction apparatus comprising a memory; and one or more processors; wherein the memory and the one or more processors are connected with each other, and the memory stores computer-executable instructions for controlling the one or more processors to determine a pupil position in a reference pupil image of a user; determine a gaze point in a virtual image based on the pupil position in the reference pupil image and a mapping relationship between first coordinates in a first coordinate system of the reference pupil image and second coordinates in a second coordinate system of the virtual image; determine whether the gaze point is in an activatable region of the virtual image; determine a gaze state of the user; and execute an operation based on a determination that the gaze point is in an activatable region of the virtual image and a determination of a gaze state.

Optionally, the memory stores computer-executable instructions for controlling the one or more processors to determine whether the gaze point is in the activatable region of the virtual image; and determine the gaze state of the user.

Optionally, the memory further stores computer-executable instructions for controlling the one or more processors to perform a noise filtering process on the reference pupil image to generate a filtered image; separate an image of pupil from the filtered image; remove interference points from the image of pupil; ellipse fit edge points of the image of pupil subsequent to removing the interference points to obtain an elliptical pupil region; and calculate a central point of the elliptical pupil region, thereby determining the pupil position.

Optionally, to determine the mapping relationship, the memory further stores computer-executable instructions for controlling the one or more processors to select a first calibration point, a second calibration point, and a third calibration point in the virtual image, the first calibration point, the second calibration point, and the third calibration point being non-collinear; display the first calibration point in a first calibration virtual image, the second calibration point in a second calibration virtual image, and the third calibration point in a third calibration virtual image; determine a first calibration pupil position in a first calibration pupil image captured when the user is gazing at the first calibration point in the first calibration virtual image, a second calibration pupil position in a second calibration pupil image captured when the user is gazing at the second calibration point in the second calibration virtual image, and a third calibration pupil position in a third calibration pupil image captured when the user is gazing at the third calibration point in the third calibration virtual image; and calculate a gaze calibration coefficient based on the first calibration pupil position, the second calibration pupil position, the third calibration pupil position, and positions of the first calibration point, the second calibration point, and the third calibration point in the virtual image.

Optionally, the gaze calibration coefficient is expressed as:

$$X_{scale} = \frac{(x_O - x_A) + (x_B - x_O)}{|x'_O - x'_A| + |x'_B - x'_O|},$$

$$Y_{scale} = \frac{(y_O - y_A) + (y_B - y_O)}{|y'_O - y'_A| + |y'_O - y'_B|};$$

wherein $X_{scale}$ is a horizontal calibration coefficient, $Y_{scale}$ is a vertical calibration coefficient. $x_O$ is a horizontal coordinate of the first calibration point, $y_O$ is a vertical coordinate of the first calibration point, $x_A$ is a horizontal coordinate of the second calibration point, $Y_A$ is a vertical coordinate of the second calibration point, $x_B$ is a horizontal coordinate of the third calibration point, $y_B$ is a vertical coordinate of the third calibration point. $x'_O$ is a horizontal coordinate of the first calibration pupil position when the user is gazing at the first calibration point in the first calibration virtual image, $y'_O$ is a vertical coordinate of the first calibration pupil position when the user is gazing at the first calibration point in the first calibration virtual image. $x'_A$ is a horizontal coordinate of the second calibration pupil position when the user is gazing at the second calibration point in the second calibration virtual image, $y'_A$ is a vertical coordinate of the second calibration pupil position when the user is gazing at the second calibration point in the second calibration virtual image. $x'_B$ is a horizontal coordinate of the third calibration pupil position when the user is gazing at the third calibration point in the third calibration virtual image, and $y'_B$ is a vertical coordinate of the third calibration pupil position when the user is gazing at the third calibration point in the third calibration virtual image.

Optionally, a position of the gaze point in the virtual image is determined according to:

$$X_{gaze} = x_O + X_{scale} * (x'_O - x),$$

$$Y_{gaze} = y_O + Y_{scale} * (y'_O - y);$$

wherein $X_{gaze}$ is a horizontal coordinate of the position of the gaze point in the virtual image, $Y_{gaze}$ is a vertical coordinate of the position of the gaze point in the virtual image, $X_{scale}$ is the horizontal calibration coefficient, $Y_{scale}$ is the vertical calibration coefficient. $x_O$ is the horizontal coordinate of the first calibration point, $y_O$ is the vertical coordinate of the first calibration point, $x'_O$ is the horizontal coordinate of the first calibration pupil position when the user is gazing at the first calibration point in the first calibration virtual image, $y'_O$ is the vertical coordinate of the first calibration pupil position when the user is gazing at the first calibration point in the first calibration virtual image, x is a horizontal coordinate of the pupil position in the reference pupil image when the user is gazing at a point in the virtual image, and y is a vertical coordinate of the pupil position in the reference pupil image when the user is gazing at a point in the virtual image.

Optionally, the memory further stores computer-executable instructions for controlling the one or more processors to, based on a plurality of reference pupil images acquired during a time period, determine a total number of times, N, the gaze point is in the activatable region of the virtual image during the time period; execute a first operation in a first interaction mode based on a determination of N2>N≥N1, and resetting N to zero; execute a second operation in a second interaction mode based on a determination of N3>N≥N2, and resetting N to zero; execute a third operation in a third interaction mode based on a determination of N≥N3, and resetting N to zero; and execute no operation based on a determination of N<N1; wherein $N_1<N_2<N_3$.

Optionally, the memory stores computer-executable instructions for controlling the one or more processors to determine a pupil position of a single eye of a user in a reference pupil image of the single eye of the user; determine a gaze point of the single eye in the virtual image based on the pupil position of the single eye in the reference pupil image of the single eye and the mapping relationship between the first coordinates in the first coordinate system of the reference pupil image of the single eye and the second coordinates in the second coordinate system of the virtual image; determine whether the gaze point of the single eye is in an activatable region of the virtual image; determine a gaze state of the single eye of the user; and execute the operation based on a determination that the gaze point of the single eye is in the activatable region of the virtual image and a determination of the gaze state of the single eye.

In another aspect, the present invention provides a virtual reality display apparatus, comprising the virtual reality interaction apparatus described herein.

Optionally, the virtual reality display apparatus further comprises a camera configured to a reference pupil image of the user.

Optionally, the virtual reality display apparatus further comprises one or more infrared light sources.

In another aspect, the present invention provides a computer-program product comprising a non-transitory tangible computer-readable medium having computer-readable instructions thereon, the computer-readable instructions being executable by a processor to cause the processor to perform determining a pupil position in a reference pupil image of a user; determining a gaze point in a virtual image based on the pupil position in the reference pupil image and a mapping relationship between first coordinates in a first coordinate system of the reference pupil image and second coordinates in a second coordinate system of the virtual image; and executing an operation based on a determination that the gaze point is in an activatable region of the virtual image and a determination of a gaze state.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

A visual reticle is commonly used as a means for interaction in virtual reality technology. When a user is wearing a virtual reality apparatus, a visual reticle appears in the front of user's eyes. When the moving status of the user's head changes, the virtual reality apparatus senses the movement of the user's head using the gyroscope and compass in the virtual reality apparatus, and the visual reticle moves in response to the movement of the user's head. The visual reticle moves according to the movement of the user's head to execute an operation in the virtual reality world. In other words, the visual reticle functions similar to a mouse cursor on the virtual screen when the user is staring at the virtual screen. If the user wants to target a region on the virtual screen, he can simply move the visual reticle to that region. When the visual reticle stops at a specific activatable region, a countdown timer is displayed to inform the user that how much time is left before the click motion will be activated. Alternatively, it can be designed that the visual reticle stays for 2-3 seconds before the click motion is automatically executed. Instead of allowing the user to perform the virtual reality interaction in a natural, effective, and straightforward manner, this virtual reality interaction method requires the user to frequently move his head to perform the interaction, making the user experience unsatisfactory.

Figure 1:
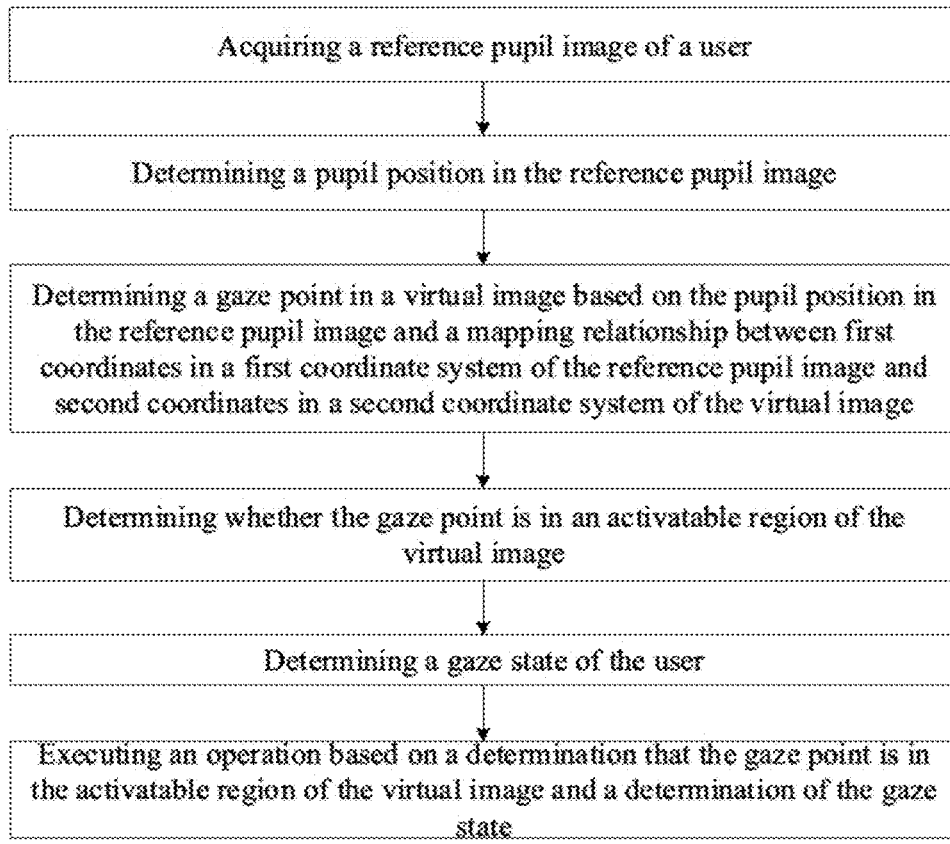
FIG. 1 is a flow chat illustrating a virtual reality interaction method in some embodiments according to the present disclosure.

Accordingly, the present disclosure provides, inter alia, a virtual reality interaction method, a virtual reality interaction apparatus, a virtual reality display apparatus, and a computer-program product that substantially obviate one or more of the problems due to limitations and disadvantages of the related art. In one aspect, the present disclosure provides a virtual reality interaction method. FIG. 1 is a flow chat illustrating a virtual reality interaction method in some embodiments according to the present disclosure. Referring to FIG. 1, a virtual reality interaction method includes acquiring a reference pupil image of a user; determining a pupil position in the reference pupil image; determining a gaze point in a virtual image based on the pupil position in the reference pupil image and a mapping relationship between first coordinates in a first coordinate system of the reference pupil image and second coordinates in a second coordinate system of the virtual image; determining whether the gaze point is in an activatable region of the virtual image, determining a gaze state of the user, and executing an operation based on a determination that the gaze point is in the activatable region of the virtual image and a determination of the gaze state.

As used herein, the term "reference pupil image" refers to an image comprising an image of a pupil of the user. The reference pupil image may optionally include other portions of a face of the user, and optionally further include a background. As used herein, the term "pupil position" refers to a position in an image (e.g., the reference pupil image) occupied by the image of the pupil. Optionally, the pupil position is a central point of a pupil region in the image. As used herein, the term "gaze point" refers to a point or an area or a region in the virtual image to which the user's gaze is directed. In some embodiments, the reference pupil image can be obtained using an infrared light source, e.g., an infrared LED light source. Optionally, the reference pupil image is an infrared light image.

Figure 2:
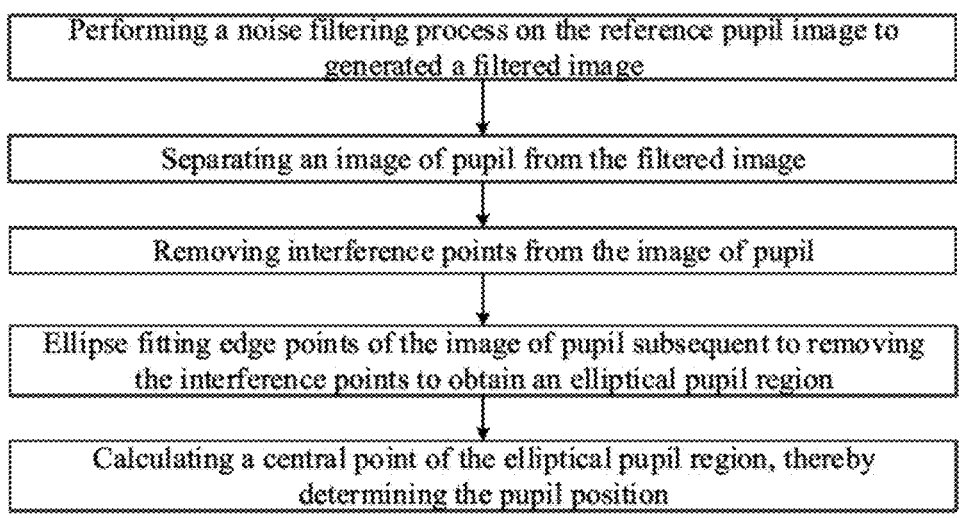
FIG. 2 is a flow chat illustrating a method of determining a pupil position in a reference pupil image in the process of a virtual reality interaction in some embodiments according to the present disclosure.

FIG. 2 is a flow chat illustrating a method of determining a pupil position in a reference pupil image in the process of a virtual reality interaction in some embodiments according to the present disclosure. Referring to FIG. 2, in some embodiments, the step of determining the pupil position in the reference pupil image includes performing a noise filtering process on the reference pupil image to generate a filtered image. Optionally, a noise filtering algorithm for the noise filtering process is Gaussian filter. In some embodiment, determining the pupil position in the reference pupil image further includes separating an image of pupil from the filtered image. Optionally, the image of pupil can be separated from the filtered image using binarization. Optionally, the threshold value selected during binarization can be an empirical value. In some embodiments, determining the pupil position in the reference pupil image further includes removing interference points from the image of pupil. Optionally, a morphological processing is applied to remove interference points. For example, subsequent to separating the image of pupil from the filtered image, the image of pupil may still include a relatively large numbers of interference points. The morphological processing can be used to remove these interference points.

In some embodiment, determining the pupil position in the reference pupil image further includes ellipse fitting edge points of the image of pupil subsequent to removing the interference points to obtain an elliptical pupil region. Optionally, the step of ellipse fitting the edge points of the image of pupil is performed based on a least square algorithm. In one example, an edge detection process is performed on the image of pupil subsequent to removing the interference points, thereby obtaining edge points of the image of pupil. Subsequently to obtaining edge points of the image of pupil, a process of ellipse fitting the edge points of the image of pupil is performed based on a least square algorithm, to obtain an elliptical pupil region.

In some embodiments, determining the pupil position in the reference pupil image further includes calculating a central point of the elliptical pupil region, thereby determining the pupil position.

Figure 3:
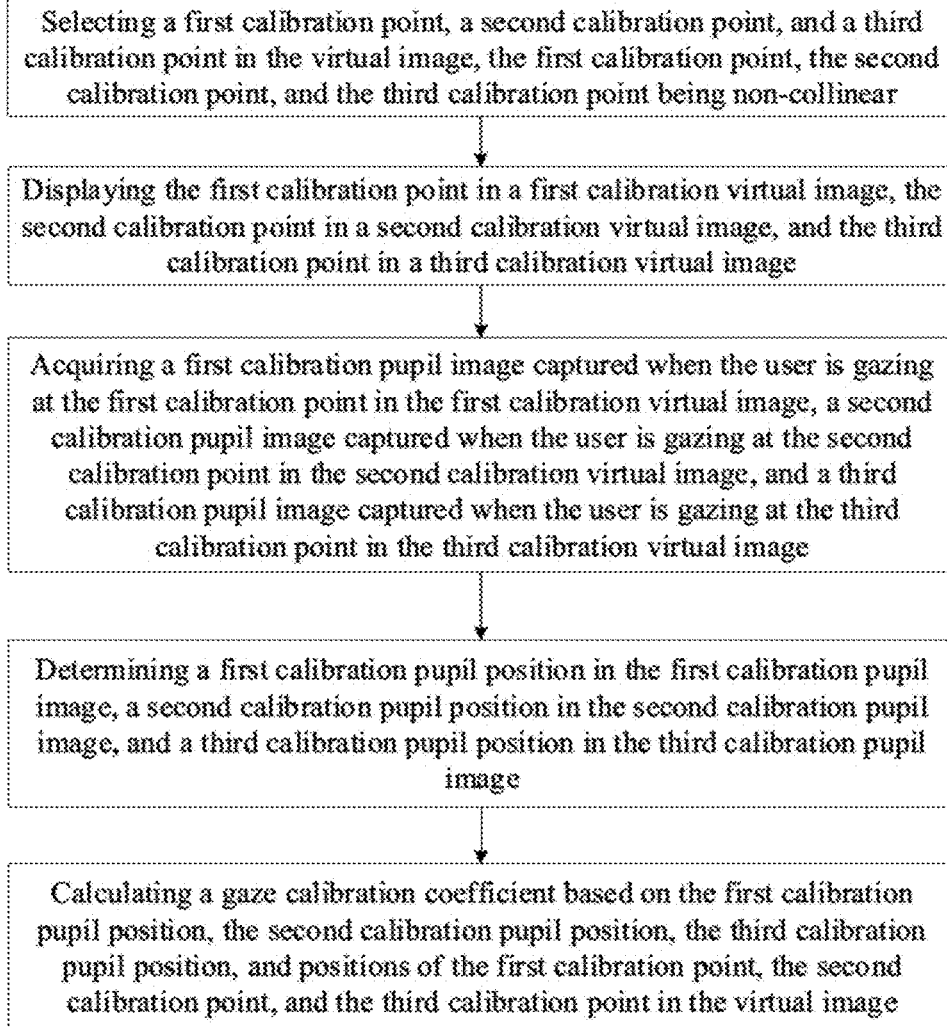
FIG. 3 is a flow chat illustrating a method of determining a mapping relationship between first coordinates in a first coordinate system of a reference pupil image and second coordinates in a second coordinate system of a virtual image in the process of a virtual reality interaction in some embodiments according to the present disclosure.
Figure 4:
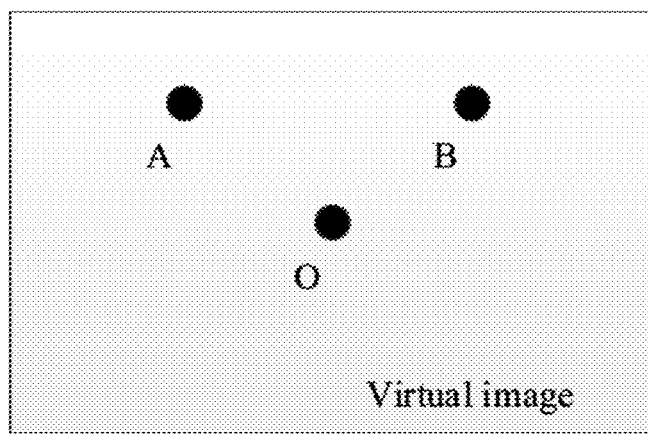
FIG. 4 is a schematic diagram showing three calibration points in some embodiments according to the present disclosure.

FIG. 3 is a flow chat illustrating a method of determining a mapping relationship between first coordinates in a first coordinate system of a reference pupil image and second coordinates in a second coordinate system of a virtual image in the process of a virtual reality interaction in some embodiments according to the present disclosure. FIG. 4 is a schematic diagram showing three calibration points in some embodiments according to the present disclosure. Referring to FIG. 3, the step of determining the mapping relationship in some embodiments includes selecting a first calibration point, a second calibration point, and a third calibration point in the virtual image, the first calibration point, the second calibration point, and the third calibration point being non-collinear. Referring to FIG. 4, a first calibration point O, a second calibration point A, and a third calibration point B are selected. In some embodiments, determining the mapping relationship further includes displaying the first calibration point in a first calibration virtual image, the second calibration point in a second calibration virtual image, and the third calibration point in a third calibration virtual image. In one example, the first calibration virtual image, the second calibration virtual image, and the third calibration virtual image are sequentially displayed.

In some embodiments, determining the mapping relationship further includes acquiring a first calibration pupil image captured when the user is gazing at the first calibration point in the first calibration virtual image, a second calibration pupil image captured when the user is gazing at the second calibration point in the second calibration virtual image, and a third calibration pupil image captured when the user is gazing at the third calibration point in the third calibration virtual image. In some embodiments, determining the mapping relationship further includes determining a first calibration pupil position in the first calibration pupil image, a second calibration pupil position in the second calibration pupil image, and a third calibration pupil position in the third calibration pupil image.

For example, referring to FIG. 4, when the first calibration point O $(x_O, y_O)$ is displayed in the first calibration virtual image, the first calibration pupil image is captured when the user is gazing at the first calibration point O $(x_O, y_O)$. A noise filtering process is performed on the first calibration pupil image thereby obtaining a filtered first calibration pupil image. Subsequent to the noise filtering process, an image of pupil is separated from the filtered first calibration pupil of image, and interference points is removed from the image of pupil. Subsequent to removing the interference points from the image of pupil, an ellipse fitting process is applied to the edge points of the image of pupil. Subsequently to the ellipse fitting, a central point of the elliptical pupil region is calculated thereby obtaining the first calibration pupil position O'(x'$_O$,y'$_O$) of the first calibration pupil image.

Similarly, when the second calibration point A(x$_A$,y$_A$) is displayed in the second calibration virtual image, the second calibration pupil image is captured when the user is gazing at the second calibration point A(x$_A$,y$_A$) in the second calibration virtual image. A noise filtering process is performed on the second calibration pupil image thereby obtaining a filtered second calibration pupil image. Subsequent to the noise filtering process, an image of pupil is separated from the filtered second calibration pupil of image, and interference points is removed from the image of pupil. Subsequent to removing the interference points from the image of pupil, ellipse fitting is applied to the edge points of the image of pupil. Subsequently to the ellipse fitting, a central point of the elliptical pupil region is calculated thereby obtaining the second calibration pupil position A'(x'$_A$,y'$_A$) of the second calibration pupil image.

In another example, when the third calibration point B(x$_B$,y$_B$) is displayed in the third calibration virtual image, the third calibration pupil image is captured when the user is gazing at the third calibration point B(x$_B$,y$_B$) in the third calibration virtual image. A noise filtering process is performed on the third calibration pupil image thereby obtaining a filtered third calibration pupil image. Subsequent to the noise filtering process, an image of pupil is separated from the filtered third calibration pupil of image, and interference points is removed from the image of pupil separated from the filtered third calibration pupil of image. Subsequent to removing the interference points from the image of pupil, ellipse fitting is applied to the edge points of the image of pupil separated from the filtered third calibration pupil of image. Subsequently to the ellipse fitting, a central point of the elliptical pupil region is calculated thereby obtaining the third calibration pupil position B'(x'$_B$, y'$_B$) of the first calibration pupil image.

In some embodiments, determining the mapping relationship further includes calculating a gaze calibration coefficient based on the first calibration pupil position, the second calibration pupil position, the third calibration pupil position, and positions of the first calibration point, the second calibration point, and the third calibration point in the virtual image. Optionally, the gaze calibration coefficient is expressed as $$X_{scale} = \frac{(x_O - x_A) + (x_B - x_O)}{|x'_O - x'_A| + |x'_B - x'_O|},$$

$$Y_{scale} = \frac{(y_O - y_A) + (y_B - y_O)}{|y'_O - y'_A| + |y'_O - y'_B|};$$

wherein X$_{scale}$ is a horizontal calibration coefficient, Y$_{scale}$ is a vertical calibration coefficient. x$_O$ is a horizontal coordinate of the first calibration point O, y$_O$ is a vertical coordinate of the first calibration point O, x$_A$ is a horizontal coordinate of the second calibration point A, y$_A$ is a vertical coordinate of the second calibration point A, x$_B$ is a horizontal coordinate of the third calibration point B, y$_B$ is a vertical coordinate of the third calibration point B, x'$_O$ is a horizontal coordinate of the first calibration pupil position when the user is gazing at the first calibration point O in the first calibration virtual image, y'$_O$ is a vertical coordinate of the first calibration pupil position when the user is gazing at the first calibration point O in the first calibration virtual image. x'$_A$ is a horizontal coordinate of the second calibration pupil position when the user is gazing at the second calibration point A in the second calibration virtual image, y'$_A$ is a vertical coordinate of the second calibration pupil position when the user is gazing at the second calibration point A in the second calibration virtual image. x'$_B$ is a horizontal coordinate of the third calibration pupil position when the user is gazing at the third calibration point B in the third calibration virtual image, and y'$_B$ is a vertical coordinate of the third calibration pupil position when the user is gazing at the third calibration point B in the third calibration virtual image.

In some embodiments, a projection of a central axis of a lens of a virtual reality interaction apparatus on the virtual image is selected as the calibration point O, further simplifying the calculation process.

Referring to FIG. 1, the virtual reality interaction method further includes determining a gaze point in a virtual image based on the pupil position in the reference pupil image and a mapping relationship between first coordinates in a first coordinate system of the reference pupil image and second coordinates in a second coordinate system of the virtual image. In some embodiments, a position of the gaze point in the virtual image is determined according to:

$$X_{gaze} = x_O + X_{scale} * (x'_O - x),$$

$$Y_{gaze} = y_O + Y_{scale} * (y'_O - y);$$

wherein X$_{gaze}$ is a horizontal coordinate of the position of the gaze point in the virtual image, Y$_{gaze}$ is a vertical coordinate of the position of the gaze point in the virtual image, X$_{scale}$ is the horizontal calibration coefficient, Y$_{scale}$ is the vertical calibration coefficient. x$_O$ is the horizontal coordinate of the first calibration point O, y$_O$ is the vertical coordinate of the first calibration point O, x'$_O$ is the horizontal coordinate of the first calibration pupil position when the user is gazing at the first calibration point O in the first calibration virtual image, y'$_O$ is the vertical coordinate of the first calibration pupil position when the user is gazing at the first calibration point O in the first calibration virtual image, x is a horizontal coordinate of the pupil position in the reference pupil image when the user is gazing at a point in the virtual image, and y is a vertical coordinate of the pupil position in the reference pupil image when the user is gazing at a point in the virtual image.

Referring to FIG. 1, the virtual reality interaction method further includes determining whether the gaze point is in an activatable region of the virtual image, determining a gaze state of the user, and executing an operation based on a determination that the gaze point is in the activatable region of the virtual image and a determination of the gaze state. Based on a determination that the user is gazing at the activatable region of the virtual image and the gaze state satisfies a condition, an interaction operation is executed. When the user uses VR glasses to watch a video or an image, the user can gaze at the non-activatable region of the virtual image to avoid unintended interaction operation.

In some embodiments, executing an operation based on a determination that the gaze point is in the activatable region of the virtual image and a determination of the gaze state. Optionally, the step of determining the gaze state includes acquiring a plurality of reference pupil images during a time period, and determining a total number of times, N, the gaze point is in the activatable region of the virtual image during the time period based on the plurality of reference pupil images. Optionally, the step of executing the operation includes executing a first operation in a first interaction mode based on a determination of N2>N≥N1, and resetting N to zero; executing a second operation in a second interaction mode based on a determination of $N3>N≥N2$, and resetting N to zero; executing a third operation in a third interaction mode based on a determination of $N≥N3$, and resetting N to zero; and executing no operation based on a determination of $N<N1$, wherein N1, N2 and N3 are positive integers, and $N1<N2<N3$. Optionally, the first interaction mode is selected from the group consisting of clicking, double clicking, returning and no operation. Optionally, the second interaction mode is selected from the group consisting of clicking, double clicking, returning and no operation. Optionally, the third interaction mode is selected from the group consisting of clicking, double clicking, returning, and no operation. In one example, based on a determination of $N2>N≥N1$, the first operation in the first interaction mode includes selecting a program, which is equivalent to clicking, thereafter N is reset to zero. In another example, based on a determination of $N3>N≥N2$, the second interaction mode includes opening a program, which is equivalent to double clicking, thereafter, N is reset to zero. In another example, based on a determination of $N≥N3$, the third interaction mode includes returning to a home page, thereafter, N is reset to zero. In another example, based on a determination of $N<N1$, no operation is executed. Optionally, N1 is a first threshold value for selecting a program, N2 is a second threshold value for opening a program, N3 is a third threshold value for returning to home page, and $N1<N2<N3$. Optionally, when the camera frame rate is 100 Hz, $N1=30$, $N2=60$, and $N3=90$.

In some embodiments, executing an operation based on the determination that the gaze point is in the activatable region of the virtual image and the determination of the gaze state. Optionally, the step of determining the gaze state includes determining a duration T in which the user is gazing at a same activatable region of the virtual image. Durations T in different ranges respectively correspond to different interaction modes. In one example, based on a determination of $T2>T≥T1$, the first operation in the first interaction mode includes selecting a program, which equivalent to clicking, thereafter T is reset to zero. In another example, based on a determination of $T3>T≥T2$, the second operation in the second interaction mode includes opening a program, which equivalent to double clicking, thereafter, T is reset to zero. In another example, based on a determination of $T≥T3$, the third operation in the third interaction mode includes returning to home page, thereafter, T is reset to zero. In another example, based on a determination of $T<T1$, no operation is executed. Optionally, T1 is a first threshold value for selecting a program, T2 is a second threshold value for opening a program, T3 is a third threshold value for returning to home page, and $T1<T2<T3$. In one example, $T1=3$ seconds, $T2=6$ seconds, $T3=9$ seconds.

In some embodiments, the virtual reality interaction method is performed based on a gaze point of a single eye of the user. For example, the reference pupil image of the user may be a reference pupil image of a single eye of the user. In another example, the step of acquiring the reference pupil image of the user includes acquiring a reference pupil image of a single eye of the user. Optionally, the step of determining the pupil position in the reference pupil image includes determining the pupil position of the single eye in the reference pupil image of the single eye of the user. Optionally, the step of determining the gaze point in the virtual image includes determining a gaze point of the single eye in the virtual image. Optionally, the step of executing the operation is based on a determination that the gaze point of the single eye is in the activatable region of the virtual image and a determination of a gaze state of the single eye.

Figure 5:
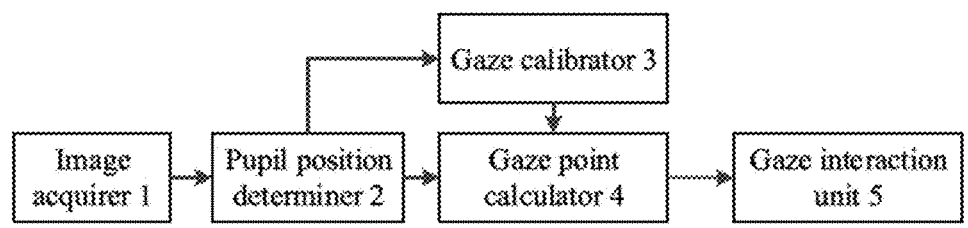
FIG. 5 is a schematic diagram illustrating the structure of a virtual reality interaction apparatus in some embodiments according to the present disclosure.

In another aspect, the present disclosure provides a virtual reality interaction apparatus. FIG. 5 is a schematic diagram illustrating the structure of a virtual reality interaction apparatus in some embodiments according to the present disclosure. Referring to FIG. 5, a virtual reality interaction apparatus includes an image acquirer 1, a pupil position determiner 2, a gaze calibrator 3, a gaze point calculator 4, and a gaze interaction unit 5.

In some embodiments, referring to FIG. 4, the image acquirer 1 is configured to acquire a reference pupil image of a user. Therefore, the reference pupil images of the user is used to track the gaze state of the user in real time. Optionally, the reference pupil image can be acquired using an infrared LED light source.

Figure 6:
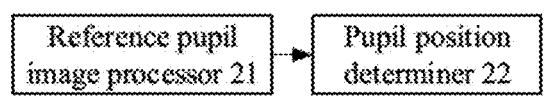
FIG. 6 is a schematic diagram illustrating the structure of a pupil position determiner of a virtual reality interaction apparatus in some embodiments according to the present disclosure.

In some embodiments, referring to FIG. 5, the pupil position determiner 2 is configured to determine a pupil position in the reference pupil image. FIG. 6 is a schematic diagram illustrating the structure of a pupil position determiner of a virtual reality interaction apparatus in some embodiments according to the present disclosure. Referring to FIG. 6, the pupil position determiner 2 in some embodiments includes a reference pupil image processor 21 and a pupil position determiner 22. Optionally, the reference pupil image processor 21 is configured to perform a noise filtering process on the reference pupil image to generate a filtered image, which can improve the quality of the filtered image. For example, a noise filtering algorithm for the noise filtering process is Gaussian filter. Optionally, the reference pupil image processor 21 is further configured to separate an image of pupil from the filtered image. For example, the image of pupil can be separated from the filtered image using binarization. For example, the threshold value selected during binarization can be an empirical value. Optionally, the reference pupil image processor 21 is further configured to remove interference points from the image of pupil. For example, a morphological processing is applied to remove interference points. Subsequent to separating the image of pupil from the filtered image, the image of pupil may still contain a relatively large amount of interference points, the morphological processing can be used to remove these interference points. Optionally, the pupil position determiner 22 is configured to ellipse fit edge points of the image of pupil subsequent to removing the interference points to obtain an elliptical pupil region, and to calculate a central point of the elliptical pupil region, thereby determining the pupil position.

In some embodiments, referring to FIG. 5, the gaze point calculator 4 is configured to determine a gaze point in a virtual image based on the pupil position in the reference pupil image and a mapping relationship between first coordinates in a first coordinate system of the reference pupil image and second coordinates in a second coordinate system of the virtual image. For example, based on real-time first coordinates in the real-time first coordinate system of the real-time reference pupil image, the second coordinates in the second coordinate system of the virtual image can be obtained using the mapping relationship.

Figure 7:
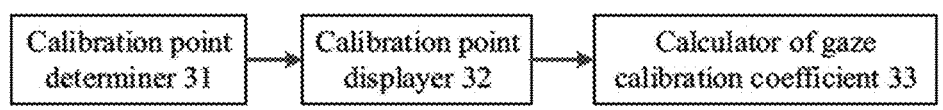
FIG. 7 is a schematic diagram illustrating the structure of a gaze calibrator of a virtual reality interaction apparatus in some embodiments according to the present disclosure.

Referring to FIG. 5, the gaze calibrator 3 in some embodiments is configured to determine the mapping relationship between the first coordinates in the first coordinate system of the reference pupil image and the second coordinates in the second coordinate system of the virtual image. FIG. 7 which is a schematic diagram illustrating the structure of a gaze calibrator of a virtual reality interaction apparatus in some embodiments according to the present disclosure. Referring to FIG. 7, the gaze calibrator 3 in some embodiments includes a calibration point determiner 31, a calibration point displayer 32, and a calculator of gaze calibration coefficient 33. Optionally, the calibration point determiner 31 is configured to select a first calibration point, a second calibration point, and a third calibration point in the virtual image, the first calibration point, the second calibration point, and the third calibration point being non-collinear. In one example, a first calibration point O, a second calibration point A and a third calibration point B in FIG. 4 are selected. Optionally, the calibration point displayer 32 is configured to display the first calibration point in a first calibration virtual image, the second calibration point in a second calibration virtual image, and the third calibration point in a third calibration virtual image, e.g., sequentially. Optionally, the calculator of gaze calibration coefficient 33 is configured to acquire a first calibration pupil image captured when the user is gazing at the first calibration point in the first calibration virtual image, a second calibration pupil image captured when the user is gazing at the second calibration point in the second calibration virtual image, and a third calibration pupil image captured when the user is gazing at the third calibration point in the third calibration virtual image; determine a first calibration pupil position in the first calibration pupil image, a second calibration pupil position in the second calibration pupil image, and a third calibration pupil position in the third calibration pupil image; and calculate a gaze calibration coefficient based on the first calibration pupil position, the second calibration pupil position, the third calibration pupil position, and positions of the first calibration point, the second calibration point, and the third calibration point in the virtual image.

For example, referring to FIG. 4 and FIG. 5, when the first calibration point O $(x_O, y_O)$ is displayed in the first calibration virtual image, the first calibration pupil image is captured by the image acquirer 1 when the user is gazing at the first calibration point O $(x_O, y_O)$ in the first calibration virtual image. Referring to FIG. 2 and FIG. 5, during the process performed by pupil position determiner 2, the noise filtering process is performed on the first calibration pupil image thereby obtaining a filtered first calibration pupil image. Subsequent to the noise filtering process, an image of pupil is separated from the filtered first calibration pupil of image, and interference points is removed from the image of pupil. Subsequent to removing the interference points from the image of pupil, ellipse fitting is applied to the edge points of the image of pupil. Subsequently to the ellipse fitting, a central point of the elliptical pupil region is calculated thereby obtaining the first calibration pupil position O'$(x'_O, y'_O)$ of the first calibration pupil image.

In another example, when the second calibration point A$(x_A, y_A)$ is displayed in the second calibration virtual image, the second calibration pupil image is captured by the image acquirer 1 when the user is gazing at the second calibration point A$(x_A, y_A)$ in the second calibration virtual image. Referring to FIG. 2 and FIG. 5, during the process performed by pupil position determiner 2, the noise filtering process is performed on the second calibration pupil image thereby obtaining a filtered second calibration pupil image. Subsequent to the noise filtering process, an image of pupil is separated from the filtered second calibration pupil of image, and interference points is removed from the image of pupil. Subsequent to removing the interference points from the image of pupil separated from the filtered second calibration pupil of image, ellipse fitting is applied to the edge points of the image of pupil. Subsequently to the ellipse fitting, a central point of the elliptical pupil region is calculated thereby obtaining the second calibration pupil position A'$(x'_A, y'_A)$ of the second calibration pupil image.

In another example, when the third calibration point B$(x_B, y_B)$ is displayed in the third calibration virtual image, the third calibration pupil image is captured by the image acquirer 1 when the user is gazing at the third calibration point B$(x_B, y_B)$ in the first calibration virtual image. Referring to FIG. 2 and FIG. 5, during the process performed by pupil position determiner 2, the noise filtering process is performed on the third calibration pupil image thereby obtaining a filtered third calibration pupil image. Subsequent to the noise filtering process, an image of pupil is separated from the filtered third calibration pupil of image, and interference points is removed from the image of pupil separated from the filtered third calibration pupil of image. Subsequent to removing the interference points from the image of pupil, ellipse fitting is applied to the edge points of the image of pupil separated from the filtered third calibration pupil of image. Subsequently to the ellipse fitting, a central point of the elliptical pupil region is calculated thereby obtaining the third calibration pupil position B'$(x'_B, y'_B)$ of the first calibration pupil image.

In some embodiment, referring to FIG. 5, the gaze calibration coefficient obtained by gaze calibrator 3 is expressed as $$X_{scale} = \frac{(x_O - x_A) + (x_B - x_O)}{|x'_O - x'_A| + |x'_B - x'_O|},$$

$$Y_{scale} = \frac{(y_O - y_A) + (y_B - y_O)}{|y'_O - y'_A| + |y'_O - y'_B|};$$

wherein $X_{scale}$ is a horizontal calibration coefficient, $Y_{scale}$ is a vertical calibration coefficient. $x_O$ is a horizontal coordinate of the first calibration point O, $y_O$ is a vertical coordinate of the first calibration point O, $x_A$ is a horizontal coordinate of the second calibration point A, $y_A$ is a vertical coordinate of the second calibration point A, $x_B$ is a horizontal coordinate of the third calibration point B, $y_B$ is a vertical coordinate of the third calibration point B, $x'_O$ is a horizontal coordinate of the first calibration pupil position when the user is gazing at the first calibration point O in the first calibration virtual image, $y'_O$ is a vertical coordinate of the first calibration pupil position when the user is gazing at the first calibration point O in the first calibration virtual image. $x'_A$ is a horizontal coordinate of the second calibration pupil position when the user is gazing at the second calibration point A in the second calibration virtual image, $y'_A$ is a vertical coordinate of the second calibration pupil position when the user is gazing at the second calibration point A in the second calibration virtual image. $x'_B$ is a horizontal coordinate of the third calibration pupil position when the user is gazing at the third calibration point B in the third calibration virtual image, and $y'_B$ is a vertical coordinate of the third calibration pupil position when the user is gazing at the third calibration point B in the third calibration virtual image.

In some embodiments, a projection of a central axis of a lens of a virtual reality interaction apparatus on the virtual image is selected as the calibration point O, further simplifying the calculation process.

In some embodiments, referring to FIG. 5, a gaze point in a virtual image is determined by the gaze point calculator 4 based on the pupil position in the reference pupil image and a mapping relationship between first coordinates in a first coordinate system of the reference pupil image and second coordinates in a second coordinate system of the virtual image. In some embodiments, a position of the gaze point in the virtual image is determined according to:

$$X_{gaze}=x_O+X_{scale}*(x'_O-x),$$

$$Y_{gaze}=y_O+Y_{scale}*(y'_O-y);$$

wherein $X_{gaze}$ is a horizontal coordinate of the position of the gaze point in the virtual image, $Y_{gaze}$ is a vertical coordinate of the position of the gaze point in the virtual image, $X_{scale}$ is the horizontal calibration coefficient, $Y_{scale}$ is the vertical calibration coefficient. $x_O$ is the horizontal coordinate of the first calibration point O, $y_O$ is the vertical coordinate of the first calibration point O, $x'_O$ is the horizontal coordinate of the first calibration pupil position when the user is gazing at the first calibration point O in the first calibration virtual image, $y'_O$ is the vertical coordinate of the first calibration pupil position when the user is gazing at the first calibration point O in the first calibration virtual image, x is a horizontal coordinate of the pupil position in the reference pupil image when the user is gazing at a point in the virtual image, and y is a vertical coordinate of the pupil position in the reference pupil image when the user is gazing at a point in the virtual image.

In some embodiments, referring to FIG. 5, the gaze interaction unit 5 is configured to execute an operation based on a determination that the gaze point is in the activatable region of the virtual image and a determination of the gaze state. Based on a determination that the user is gazing at the activatable region of the virtual image and the gaze state satisfies a condition, an interaction operation is executed by the gaze interaction unit 5. When the user uses VR glasses to watch a video or an image, the user can gaze at the non-activatable region of the virtual image to avoid unintended interaction operation.

Figure 8:
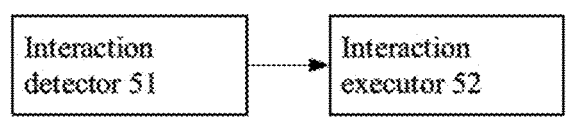
FIG. 8 is a schematic diagram illustrating the structure of a gaze interaction unit of a virtual reality interaction apparatus in some embodiments according to the present disclosure.

FIG. 8 is a schematic diagram illustrating the structure of a gaze interaction unit of a virtual reality interaction apparatus in some embodiments according to the present disclosure. Referring to FIG. 8, the gaze interaction unit 5 includes an interaction detector 51, and an interaction executor 52. Optionally, the interaction detector 51 is configured to acquire a plurality of reference pupil images during a time period and determine a total number of times, N, the gaze point is in the activatable region of the virtual image during the time period based on the plurality of reference pupil images. In one example, the interaction executor 52 is configured to execute a first operation in a first interaction mode based on a determination of N2>N≥N1, and subsequently reset N to zero. In another example, the interaction executor 52 is configured to execute a second operation in a second interaction mode based on a determination of N3>N≥N2, and subsequently reset N to zero. In another example, the interaction executor 52 is configured to execute a third operation in a third interaction mode based on a determination of N≥N3, and subsequently reset N to zero. In another example, the interaction performer 52 is configured to execute no operation based on a determination of N<N1. Optionally, N1 is a first threshold value for selecting a program, N2 is a second threshold value for opening a program, N3 is a third threshold value for returning to home page, and N1<N2<N3. Optionally, when the camera frame rate is 100 Hz, N1=30, N2=60, and N3=90.

In some embodiments, the interaction detector 51 is configured to acquire a plurality of reference pupil images during a time period and determine a duration T in which the user is gazing at a same activatable region of the virtual image. Durations T in different ranges respectively correspond to different interaction modes. In one example, based on a determination of T2>T≥T1, the interaction executor 52 is configured to execute a first operation in the first interaction mode including selecting a program, which equivalent to clicking, thereafter the interaction executor 52 is configured to reset T to zero. In another example, based on a determination of T3>T≥T2, the interaction executor 52 is configured to execute a second operation in the second interaction mode including opening a program, which equivalent to double clicking, thereafter the interaction executor 52 is configured to reset T to zero. In another example, based on a determination of T≥T3, the interaction executor 52 is configured to execute a third operation in the third interaction mode including returning to home page, thereafter the interaction executor 52 is configured to reset T to zero. In another example, based on a determination of T<T1, the interaction executor 52 is configured to execute no operation. Optionally, T1 is a first threshold value for selecting a program, T2 is a second threshold value for opening a program, T3 is a third threshold value for returning to home page, and T1<T2<T3. In one example, T1=3 seconds, T2=6 seconds, T3=9 seconds.

Figure 9:
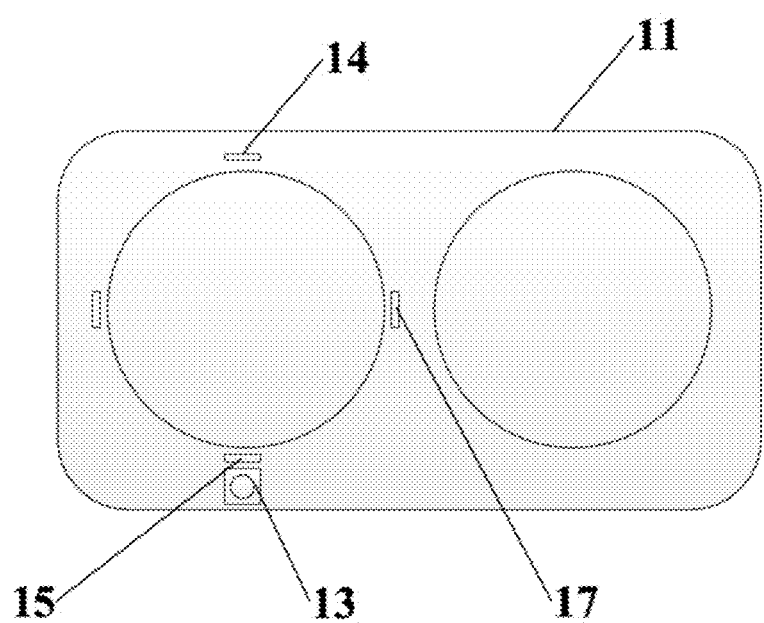
FIG. 9 is a schematic diagram illustrating the structure of a virtual reality interaction apparatus in some embodiments according to the present disclosure.

FIG. 9 is a schematic diagram illustrating the structure of a virtual reality interaction apparatus in some embodiments according to the present disclosure. A virtual reality interaction apparatus includes a case 11, two lenses 12 disposed on the case 11, a camera 13 disposed besides one of the two lenses 12, and a plurality of infrared light sources disposed around one of the two lenses 12. Referring to FIG. 5 and FIG. 9, the image acquirer 1 in some embodiments includes at least a camera 13 deposed besides one of the two lenses 12 and a plurality of infrared light sources disposed around one of the two lenses 12. According to Hering's Law of Equal Innervation, when visual motion occurs, there is a certain relationship between the movements of two eyes, e.g. the two eyes can only move toward the same direction with the same amplitude, and the two eyes never move in two opposing directions. Therefore, in order to reduce the cost of the virtual reality interaction apparatus, the virtual reality interaction apparatus can simply calculate the gaze point of a single eye, technical advantages of the present disclosure can be achieved.

In some embodiments, the camera 13 is disposed under one of the two lenses 12. Optionally, the central axis of the camera 13 points to the central of the user's respective eye. Optionally, the camera 13 is an infrared high-speed camera. For example, the sampling frequency of the camera 13 is 100 Hz, the wavelength of the infrared light source is 850 nm. The infrared light source provides uniform fill light to user's eye, which is easy to separate the pupil from the iris area thereby obtaining a relatively clear reference pupil image of a user.

In some embodiments, referring to both FIG. 5 and FIG. 9, the image acquirer 1 includes 4 infrared light sources respectively disposed surround one of the two lenses 12. Optionally, an infrared light source 14 is disposed on the top of one of the two lenses 12, an infrared light source 15 is disposed on the bottom of the same one of the two lenses 12, an infrared light source 16 is disposed on the left side of the same one of the two lenses 12, and an infrared light source 17 is disposed on the right side of the same one of the two lenses 12. All of the infrared light sources are used to provide fill light.

In some embodiments, referring to FIG. 5 to FIG. 9, when the virtual reality interaction apparatus is working, the 4 infrared light sources are turned on, the calibration point displayer 32 displays the first calibration point in a first calibration virtual image, the second calibration point in a second calibration virtual image, and the third calibration point in a third calibration virtual image. The camera 13 acquires a first calibration pupil image captured when the user is gazing at the first calibration point in the first calibration virtual image, a second calibration pupil image captured when the user is gazing at the second calibration point in the second calibration virtual image, and a third calibration pupil image captured when the user is gazing at the third calibration point in the third calibration virtual image. The pupil position determiner 2 determines a first calibration pupil position in the first calibration pupil image, a second calibration pupil position in the second calibration pupil image, and a third calibration pupil position in the third calibration pupil image. The calculator of gaze calibration coefficient 33 calculates a gaze calibration coefficient based on the first calibration pupil position, the second calibration pupil position, the third calibration pupil position, and positions of the first calibration point, the second calibration point, and the third calibration point in the virtual image. Subsequent to obtaining the gaze calibration coefficient, the camera 13 acquires a reference pupil image of a user, thereby, the pupil position determiner 2 determines a pupil position in the reference pupil image. The calculator of gaze point calculator 4 determines a gaze point in a virtual image based on the pupil position in the reference pupil image and a mapping relationship between first coordinates in a first coordinate system of the reference pupil image and second coordinates in a second coordinate system of the virtual image. The gaze interaction unit 5 determines whether the gaze point is in an activatable region of the virtual image, determines a gaze state of the user, and executes an operation based on a determination that the gaze point is in the activatable region of the virtual image and a determination of the gaze state.

In some embodiments, the virtual reality interaction apparatus includes a memory; and one or more processors. The memory and the one or more processors are connected with each other. The memory stores computer-executable instructions for controlling the one or more processors to determine a pupil position in a reference pupil image of a user; determine a gaze point in a virtual image based on the pupil position in the reference pupil image and a mapping relationship between first coordinates in a first coordinate system of the reference pupil image and second coordinates in a second coordinate system of the virtual image; determine whether the gaze point is in an activatable region of the virtual image; determine a gaze state of the user; and execute an operation based on a determination that the gaze point is in an activatable region of the virtual image and a determination of a gaze state. Optionally, the memory stores computer-executable instructions for controlling the one or more processors to determine whether the gaze point is in the activatable region of the virtual image; and determine the gaze state of the user.

In some embodiments, to determine the pupil position in the reference pupil image, the memory further stores computer-executable instructions for controlling the one or more processors to perform a noise filtering process on the reference pupil image to generate a filtered image; separate an image of pupil from the filtered image; remove interference points from the image of pupil; ellipse fit edge points of the image of pupil subsequent to removing the interference points to obtain an elliptical pupil region; and calculate a central point of the elliptical pupil region, thereby determining the pupil position.

In some embodiments, to determine the mapping relationship between the first coordinates in the first coordinate system of the reference pupil image and the second coordinates in the second coordinate system of the virtual image, the memory further stores computer-executable instructions for controlling the one or more processors to select a first calibration point, a second calibration point, and a third calibration point in the virtual image, the first calibration point, the second calibration point, and the third calibration point being non-collinear; display the first calibration point in a first calibration virtual image, the second calibration point in a second calibration virtual image, and the third calibration point in a third calibration virtual image; determine a first calibration pupil position in a first calibration pupil image captured when the user is gazing at the first calibration point in the first calibration virtual image, a second calibration pupil position in a second calibration pupil image captured when the user is gazing at the second calibration point in the second calibration virtual image, and a third calibration pupil position in a third calibration pupil image captured when the user is gazing at the third calibration point in the third calibration virtual image; and calculate a gaze calibration coefficient based on the first calibration pupil position, the second calibration pupil position, the third calibration pupil position, and positions of the first calibration point, the second calibration point, and the third calibration point in the virtual image. Optionally, the virtual reality interaction apparatus further includes a camera to acquire the first calibration pupil image captured when the user is gazing at the first calibration point in the first calibration virtual image, the second calibration pupil image captured when the user is gazing at the second calibration point in the second calibration virtual image, and the third calibration pupil image captured when the user is gazing at the third calibration point in the third calibration virtual image.

In some embodiments, the memory further stores computer-executable instructions for controlling the one or more processors to, based on a plurality of reference pupil images acquired during a time period, determine a total number of times, N, the gaze point is in the activatable region of the virtual image during the time period; execute a first operation in a first interaction mode based on a determination of $N2 > N \geq N1$, and resetting N to zero; execute a second operation in a second interaction mode based on a determination of $N3 > N \geq N2$, and resetting N to zero; execute a third operation in a third interaction mode based on a determination of $N \geq N3$, and resetting N to zero; and execute no operation based on a determination of $N < N1$. Optionally, $N_1 < N_2 < N_3$.

In some embodiments, the virtual reality interaction apparatus executes the operation based on a pupil position of a single eye of a user. Optionally, the memory stores computer-executable instructions for controlling the one or more processors to determine a pupil position of a single eye of a user in a reference pupil image of the single eye of the user. Optionally, the memory stores computer-executable instructions for controlling the one or more processors to determine a gaze point of the single eye in the virtual image based on the pupil position of the single eye in the reference pupil image of the single eye and the mapping relationship between the first coordinates in the first coordinate system of the reference pupil image of the single eye and the second coordinates in the second coordinate system of the virtual image. Optionally, the memory stores computer-executable instructions for controlling the one or more processors to determine whether the gaze point of the single eye is in an activatable region of the virtual image. Optionally, the memory stores computer-executable instructions for controlling the one or more processors to determine a gaze state of the single eye of the user. Optionally, the memory stores computer-executable instructions for controlling the one or more processors to execute the operation based on a determination that the gaze point of the single eye is in the activatable region of the virtual image and a determination of the gaze state of the single eye.

In another aspect, the present disclosure further provides a virtual reality display apparatus having the virtual reality interaction apparatus described herein. Optionally, the virtual reality display apparatus further includes a camera configured to a reference pupil image of the user. Optionally, the virtual reality display apparatus further includes one or more infrared light sources.

In another aspect, the present disclosure further provides a computer-program product comprising a non-transitory tangible computer-readable medium having computer-readable instructions thereon. In some embodiments, the computer-readable instructions being executable by a processor to cause the processor to perform determining a pupil position in a reference pupil image of a user; determining a gaze point in a virtual image based on the pupil position in the reference pupil image and a mapping relationship between first coordinates in a first coordinate system of the reference pupil image and second coordinates in a second coordinate system of the virtual image; and executing an operation based on a determination that the gaze point is in an activatable region of the virtual image and a determination of a gaze state. Optionally, the computer-readable instructions being executable by a processor to cause the processor to perform determining whether the gaze point is in the activatable region of the virtual image; and determining the gaze state of the user.

In some embodiments, the computer-readable instructions are executable by a processor to further cause the processor to perform a noise filtering process on the reference pupil image to generate a filtered image; separating an image of pupil from the filtered image; removing interference points from the image of pupil; ellipse fitting edge points of the image of pupil subsequent to removing the interference points to obtain an elliptical pupil region; and calculating a central point of the elliptical pupil region, thereby determining the pupil position.

In some embodiments, to determine the mapping relationship between the first coordinates in the first coordinate system of the reference pupil image and the second coordinates in the second coordinate system of the virtual image, the computer-readable instructions are executable by a processor to further cause the processor to perform selecting a first calibration point, a second calibration point, and a third calibration point in the virtual image, the first calibration point, the second calibration point, and the third calibration point being non-collinear; displaying the first calibration point in a first calibration virtual image, the second calibration point in a second calibration virtual image, and the third calibration point in a third calibration virtual image; determining a first calibration pupil position in a first calibration pupil image captured when the user is gazing at the first calibration point in the first calibration virtual image, a second calibration pupil position in a second calibration pupil image captured when the user is gazing at the second calibration point in the second calibration virtual image, and a third calibration pupil position in a third calibration pupil image captured when the user is gazing at the third calibration point in the third calibration virtual image; and calculating a gaze calibration coefficient based on the first calibration pupil position, the second calibration pupil position, the third calibration pupil position, and positions of the first calibration point, the second calibration point, and the third calibration point in the virtual image.

In some embodiment, the gaze calibration coefficient is expressed as:

$$X_{scale} = \frac{(x_O - x_A) + (x_B - x_O)}{|x'_O - x'_A| + |x'_B - x'_O|},$$

$$Y_{scale} = \frac{(y_O - y_A) + (y_B - y_O)}{|y'_O - y'_A| + |y'_O - y'_B|};$$

wherein $X_{scale}$ is a horizontal calibration coefficient, $Y_{scale}$ is a vertical calibration coefficient. $x_O$ is a horizontal coordinate of the first calibration point O, $y_O$ is a vertical coordinate of the first calibration point O, $x_A$ is a horizontal coordinate of the second calibration point A, $y_A$ is a vertical coordinate of the second calibration point A, $x_B$ is a horizontal coordinate of the third calibration point B, $y_B$ is a vertical coordinate of the third calibration point B, $x'_O$ is a horizontal coordinate of the first calibration pupil position when the user is gazing at the first calibration point O in the first calibration virtual image, $y'_O$ is a vertical coordinate of the first calibration pupil position when the user is gazing at the first calibration point O in the first calibration virtual image. $x'_A$ is a horizontal coordinate of the second calibration pupil position when the user is gazing at the second calibration point A in the second calibration virtual image, $y'_A$ is a vertical coordinate of the second calibration pupil position when the user is gazing at the second calibration point A in the second calibration virtual image. $x'_B$ is a horizontal coordinate of the third calibration pupil position when the user is gazing at the third calibration point B in the third calibration virtual image, and $y'_B$ is a vertical coordinate of the third calibration pupil position when the user is gazing at the third calibration point B in the third calibration virtual image.

In some embodiments, a position of the gaze point in the virtual image is determined according to:

$$X_{gaze} = x_O + X_{scale} * (x'_O - x),$$

$$Y_{gaze} = y_O + Y_{scale} * (y'_O - y);$$

wherein $X_{gaze}$ is a horizontal coordinate of the position of the gaze point in the virtual image, $Y_{gaze}$ is a vertical coordinate of the position of the gaze point in the virtual image, $X_{scale}$ is the horizontal calibration coefficient, $Y_{scale}$ is the vertical calibration coefficient. $x_O$ is the horizontal coordinate of the first calibration point O, $y_O$ is the vertical coordinate of the first calibration point O, $x'_O$ is the horizontal coordinate of the first calibration pupil position when the user is gazing at the first calibration point O in the first calibration virtual image, $y'_O$ is the vertical coordinate of the first calibration pupil position when the user is gazing at the first calibration point O in the first calibration virtual image, x is a horizontal coordinate of the pupil position in the reference pupil image when the user is gazing at a point in the virtual image, and y is a vertical coordinate of the pupil position in the reference pupil image when the user is gazing at a point in the virtual image.

In some embodiments, the computer-readable instructions are executable by a processor to further cause the processor to perform, based on a plurality of reference pupil images acquired during a time period, determining a total number of times, N, the gaze point is in the activatable region of the virtual image during the time period; executing a first operation in a first interaction mode based on a determination of N2>N≥N1, and resetting N to zero; executing a second operation in a second interaction mode based on a determination of N3>N≥N2, and resetting N to zero; executing a third operation in a third interaction mode based on a determination of N≥N3, and resetting N to zero; and executing no operation based on a determination of N<N1. Optionally, $N_1 < N_2 < N_3$.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A virtual reality interaction apparatus, comprising:
a memory; and
one or more processors;
wherein the memory and the one or more processors are connected with each other; and
the memory stores computer-executable instructions for controlling the one or more processors to:
determine a pupil position in a reference pupil image of a user;
determine a gaze point in a virtual image based on the pupil position in the reference pupil image and a mapping relationship between first coordinates in a first coordinate system of the reference pupil image and second coordinates in a second coordinate system of the virtual image;
determine whether the gaze point is in an activatable region of the virtual image;
determine a gaze state of the user; and
execute an operation based on a determination that the gaze point is in an activatable region of the virtual image and a determination of a gaze state;

wherein, to determine the mapping relationship, the memory further stores computer-executable instructions for controlling the one or more processors to:
select a first calibration point, a second calibration point, and a third calibration point in the virtual image, the first calibration point, the second calibration point, and the third calibration point being non-collinear;
display the first calibration point in a first calibration virtual image, the second calibration point in a second calibration virtual image, and the third calibration point in a third calibration virtual image;
determine a first calibration pupil position in a first calibration pupil image captured when the user is gazing at the first calibration point in the first calibration virtual image, a second calibration pupil position in a second calibration pupil image captured when the user is gazing at the second calibration point in the second calibration virtual image, and a third calibration pupil position in a third calibration pupil image captured when the user is gazing at the third calibration point in the third calibration virtual image; and
calculate a gaze calibration coefficient based on the first calibration pupil position, the second calibration pupil position, the third calibration pupil position, and positions of the first calibration point, the second calibration point, and the third calibration point in the virtual image.

2. The virtual reality interaction apparatus of claim 1, wherein the memory stores computer-executable instructions for controlling the one or more processors to:
determine whether the gaze point is in the activatable region of the virtual image; and
determine the gaze state of the user.

3. The virtual reality interaction apparatus of claim 1, wherein the memory further stores computer-executable instructions for controlling the one or more processors to:
perform a noise filtering process on the reference pupil image to generate a filtered image;
separate an image of pupil from the filtered image;
remove interference points from the image of pupil;
ellipse fit edge points of the image of pupil subsequent to removing the interference points to obtain an elliptical pupil region; and
calculate a central point of the elliptical pupil region, thereby determining the pupil position.

4. The virtual reality interaction apparatus of claim 1, wherein the gaze calibration coefficient is expressed as:

$$X_{scale} = \frac{(x_O - x_A) + (x_B - x_O)}{|x'_O - x'_A| + |x'_B - x'_O|},$$

$$Y_{scale} = \frac{(y_O - y_A) + (y_B - y_O)}{|y'_O - y'_A| + |y'_O - y'_B|};$$

wherein $X_{scale}$ is a horizontal calibration coefficient, $Y_{scale}$ is a vertical calibration coefficient, $x_O$ is a horizontal coordinate of the first calibration point, $y_O$ is a vertical coordinate of the first calibration point, $x_A$ is a horizontal coordinate of the second calibration point, $y_A$ is a vertical coordinate of the second calibration point, $x_B$ is a horizontal coordinate of the third calibration point, $y_B$ is a vertical coordinate of the third calibration point, $x'_O$ is a horizontal coordinate of the first calibration pupil position when the user is gazing at the first calibration point in the first calibration virtual image, $y'_O$ is a vertical coordinate of the first calibration pupil position when the user is gazing at the first calibration point in the first calibration virtual image, $x'_A$ is a horizontal coordinate of the second calibration pupil position when the user is gazing at the second calibration point in the second calibration virtual image, $y'_A$ is a vertical coordinate of the second calibration pupil position when the user is gazing at the second calibration point in the second calibration virtual image, $x'_B$ is a horizontal coordinate of the third calibration pupil position when the user is gazing at the third calibration point in the third calibration virtual image, and $y'_B$ is a vertical coordinate of the third calibration pupil position when the user is gazing at the third calibration point in the third calibration virtual image.

5. The virtual reality interaction apparatus of claim 4, wherein a position of the gaze point in the virtual image is determined according to:

$$X_{gaze} = x_O + X_{scale} * (x'_O - x),$$

$$Y_{gaze} = y_O + Y_{scale} * (y'_O - y);$$

wherein $X_{gaze}$ is a horizontal coordinate of the position of the gaze point in the virtual image, $Y_{gaze}$ is a vertical coordinate of the position of the gaze point in the virtual image, $X_{scale}$ is the horizontal calibration coefficient, $Y_{scale}$ is the vertical calibration coefficient, $x_O$ is the horizontal coordinate of the first calibration point, $y_O$ is the vertical coordinate of the first calibration point, $x'_O$ is the horizontal coordinate of the first calibration pupil position when the user is gazing at the first calibration point in the first calibration virtual image, $y'_O$ is the vertical coordinate of the first calibration pupil position when the user is gazing at the first calibration point in the first calibration virtual image, x is a horizontal coordinate of the pupil position in the reference pupil image when the user is gazing at a point in the virtual image, and y is a vertical coordinate of the pupil position in the reference pupil image when the user is gazing at a point in the virtual image.

6. The virtual reality interaction apparatus of claim 1, wherein the memory further stores computer-executable instructions for controlling the one or more processors to:
based on a plurality of reference pupil images acquired during a time period, determine a total number of times, N, the gaze point is in the activatable region of the virtual image during the time period;
execute a first operation in a first interaction mode based on a determination of $N_2 > N \geq N_1$, and resetting N to zero;
execute a second operation in a second interaction mode based on a determination of $N_3 > N \geq N_2$, and resetting N to zero;
execute a third operation in a third interaction mode based on a determination of $N \geq N_3$, and resetting N to zero; and
execute no operation based on a determination of $N < N_1$;
wherein $N_1 < N_2 < N_3$.

7. The virtual reality interaction apparatus of claim 1, wherein the memory stores computer-executable instructions for controlling the one or more processors to:
determine a pupil position of a single eye of a user in a reference pupil image of the single eye of the user;
determine a gaze point of the single eye in the virtual image based on the pupil position of the single eye in the reference pupil image of the single eye and the mapping relationship between the first coordinates in the first coordinate system of the reference pupil image of the single eye and the second coordinates in the second coordinate system of the virtual image;
determine whether the gaze point of the single eye is in an activatable region of the virtual image;
determine a gaze state of the single eye of the user; and
execute the operation based on a determination that the gaze point of the single eye is in the activatable region of the virtual image and a determination of the gaze state of the single eye.

8. A virtual reality display apparatus, comprising the virtual reality interaction apparatus of claim 1.

9. The virtual reality display apparatus of claim 8, further comprising a camera configured to acquire a reference pupil image of the user.

10. The virtual reality display apparatus of claim 9, further comprising one or more infrared light sources.

11. A computer-program product comprising a non-transitory tangible computer-readable medium having computer-readable instructions thereon, the computer-readable instructions being executable by a processor to cause the processor to perform:
determining a pupil position in a reference pupil image of a user;
determining a gaze point in a virtual image based on the pupil position in the reference pupil image and a mapping relationship between first coordinates in a first coordinate system of the reference pupil image and second coordinates in a second coordinate system of the virtual image;
executing an operation based on a determination that the gaze point is in an activatable region of the virtual image and a determination of a gaze state;
determining the mapping relationship between the first coordinates in the first coordinate system of the reference pupil image and the second coordinates in the second coordinate system of the virtual image;
wherein the determining the mapping relationship comprises:
selecting a first calibration point, a second calibration point, and a third calibration point in the virtual image, the first calibration point, the second calibration point, and the third calibration point being non-collinear;
displaying the first calibration point in a first calibration virtual image, the second calibration point in a second calibration virtual image, and the third calibration point in a third calibration virtual image;
acquiring a first calibration pupil image captured when the user is gazing at the first calibration point in the first calibration virtual image, a second calibration pupil image captured when the user is gazing at the second calibration point in the second calibration virtual image, and a third calibration pupil image captured when the user is gazing at the third calibration point in the third calibration virtual image;
determining a first calibration pupil position in the first calibration pupil image, a second calibration pupil position in the second calibration pupil image, and a third calibration pupil position in the third calibration pupil image; and
calculating a gaze calibration coefficient based on the first calibration pupil position, the second calibration pupil position, the third calibration pupil position, and positions of the first calibration point, the second calibration point, and the third calibration point in the virtual image.

12. A virtual reality interaction method, comprising:
acquiring a reference pupil image of a user;
determining a pupil position in the reference pupil image;
determining a gaze point in a virtual image based on the pupil position in the reference pupil image and a mapping relationship between first coordinates in a first coordinate system of the reference pupil image and second coordinates in a second coordinate system of the virtual image;
executing an operation based on a determination that the gaze point is in an activatable region of the virtual image and a determination of a gaze state; and
determining the mapping relationship between the first coordinates in the first coordinate system of the reference pupil image and the second coordinates in the second coordinate system of the virtual image;
wherein the determining the mapping relationship comprises:
selecting a first calibration point, a second calibration point, and a third calibration point in the virtual image, the first calibration point, the second calibration point, and the third calibration point being non-collinear;
displaying the first calibration point in a first calibration virtual image, the second calibration point in a second calibration virtual image, and the third calibration point in a third calibration virtual image;
acquiring a first calibration pupil image captured when the user is gazing at the first calibration point in the first calibration virtual image, a second calibration pupil image captured when the user is gazing at the second calibration point in the second calibration virtual image, and a third calibration pupil image captured when the user is gazing at the third calibration point in the third calibration virtual image;
determining a first calibration pupil position in the first calibration pupil image, a second calibration pupil position in the second calibration pupil image, and a third calibration pupil position in the third calibration pupil image; and
calculating a gaze calibration coefficient based on the first calibration pupil position, the second calibration pupil position, the third calibration pupil position, and positions of the first calibration point, the second calibration point, and the third calibration point in the virtual image.

13. The virtual reality interaction method of claim 12, wherein further comprising:
determining whether the gaze point is in the activatable region of the virtual image; and
determining the gaze state of the user.

14. The virtual reality interaction method of claim 12, wherein determining the pupil position in the reference pupil image comprises:
performing a noise filtering process on the reference pupil image to generate a filtered image;
separating an image of pupil from the filtered image;
removing interference points from the image of pupil;
ellipse fitting edge points of the image of pupil subsequent to removing the interference points to obtain an elliptical pupil region; and
calculating a central point of the elliptical pupil region, thereby determining the pupil position.

15. The virtual reality interaction method of claim 12, wherein the gaze calibration coefficient is expressed as:

$$X_{scale} = \frac{(x_O - x_A) + (x_B - x_O)}{|x'_O - x'_A| + |x'_B - x'_O|},$$

$$Y_{scale} = \frac{(y_O - y_A) + (y_B - y_O)}{|y'_O - y'_A| + |y'_O - y'_B|};$$

wherein $X_{scale}$ is a horizontal calibration coefficient, $Y_{scale}$ is a vertical calibration coefficient, $x_O$ is a horizontal coordinate of the first calibration point, $y_O$ is a vertical coordinate of the first calibration point, $x_A$ is a horizontal coordinate of the second calibration point, $y_A$ is a vertical coordinate of the second calibration point, $x_B$ is a horizontal coordinate of the third calibration point, $y_B$ is a vertical coordinate of the third calibration point, $x'_O$ is a horizontal coordinate of the first calibration pupil position when the user is gazing at the first calibration point in the first calibration virtual image, $y'_O$ is a vertical coordinate of the first calibration pupil position when the user is gazing at the first calibration point in the first calibration virtual image, $x'_A$ is a horizontal coordinate of the second calibration pupil position when the user is gazing at the second calibration point in the second calibration virtual image, $y'_A$ is a vertical coordinate of the second calibration pupil position when the user is gazing at the second calibration point in the second calibration virtual image, $x'_B$ is a horizontal coordinate of the third calibration pupil position when the user is gazing at the third calibration point in the third calibration virtual image, and $y'_B$ is a vertical coordinate of the third calibration pupil position when the user is gazing at the third calibration point in the third calibration virtual image.

16. The virtual reality interaction method of claim 15, wherein a position of the gaze point in the virtual image is determined according to:

$$X_{gaze} = x_O + X_{scale} * (x'_O - x),$$

$$Y_{gaze} = y_O + Y_{scale} * (y'_O - y);$$

wherein $X_{gaze}$ is a horizontal coordinate of the position of the gaze point in the virtual image, $Y_{gaze}$ is a vertical coordinate of the position of the gaze point in the virtual image, $X_{gaze}$ is the horizontal calibration coefficient, $Y_{scale}$ is the vertical calibration coefficient, $x_O$ is the horizontal coordinate of the first calibration point, $y_O$ is the vertical coordinate of the first calibration point, $x'_O$ is the horizontal coordinate of the first calibration pupil position when the user is gazing at the first calibration point in the first calibration virtual image, $y'_O$ is the vertical coordinate of the first calibration pupil position when the user is gazing at the first calibration point in the first calibration virtual image, x is a horizontal coordinate of the pupil position in the reference pupil image when the user is gazing at a point in the virtual image, and y is a vertical coordinate of the pupil position in the reference pupil image when the user is gazing at a point in the virtual image.

17. The virtual reality interaction method of claim 12, wherein executing the operation based on the determination that the gaze point is in the activatable region of the virtual image and the determination of the gaze state comprises:
acquiring a plurality of reference pupil images during a time period;

determining a total number of times, N, the gaze point is in the activatable region of the virtual image during the time period based on the plurality of reference pupil images;

executing a first operation in a first interaction mode based on a determination of $N2 > N \geq N1$, and resetting N to zero;

executing a second operation in a second interaction mode based on a determination of $N3 > N \geq N2$, and resetting N to zero;

executing a third operation in a third interaction mode based on a determination of $N \geq N3$, and resetting N to zero; and executing no operation based on a determination of $N < N1$;

wherein $N_1 < N_2 < N_3$.

18. The virtual reality interaction method of claim 12, wherein acquiring the reference pupil image of the user comprises acquiring a reference pupil image of a single eye of the user;

determining the pupil position in the reference pupil image comprises determining the pupil position of the single eye in the reference pupil image of the single eye of the user;

determining the gaze point in the virtual image comprises determining a gaze point of the single eye in the virtual image; and executing the operation is based on a determination that the gaze point of the single eye is in the activatable region of the virtual image and a determination of a gaze state of the single eye.

* * * * *